United States Patent [19]
McAtee, Jr.

[11] Patent Number: 5,266,991
[45] Date of Patent: Nov. 30, 1993

[54] AUXILIARY CAMERA KNOB

[76] Inventor: George W. McAtee, Jr., 570 Gilletts Lake Rd., Jackson, Mich. 49201

[21] Appl. No.: 867,353

[22] Filed: Apr. 13, 1992

[51] Int. Cl.$^5$ .............................................. G03B 1/18
[52] U.S. Cl. .................................. 354/195.1; 74/545; 74/553
[58] Field of Search ................ 354/195.1; 74/553, 545

[56] References Cited

U.S. PATENT DOCUMENTS

| | | | |
|---|---|---|---|
| 372,649 | 11/1887 | Aloen | 74/553 |
| 2,688,678 | 9/1954 | Henderson | 74/553 |
| 4,117,568 | 10/1978 | Bullock | 74/545 |
| 4,220,054 | 9/1980 | Kuhlman | 74/545 |

*Primary Examiner*—Monroe H. Hayes
*Attorney, Agent, or Firm*—Beaman & Beaman

[57] ABSTRACT

An auxiliary knob used in conjunction with camera focusing knobs to improve the focusing operation and improve access for focusing. An elastomeric body includes a recess frictionally receiving the camera focusing knob, and a knob turning surface defined upon the elastomeric body of a diameter substantially greater than the diameter of the camera focusing knob reduces the effort required for focusing and improves knob access. Reduced wall thickness lips and rims defined on the auxiliary knob facilitate cooperation with the camera focusing knob and improve the knob handling characteristics.

4 Claims, 1 Drawing Sheet

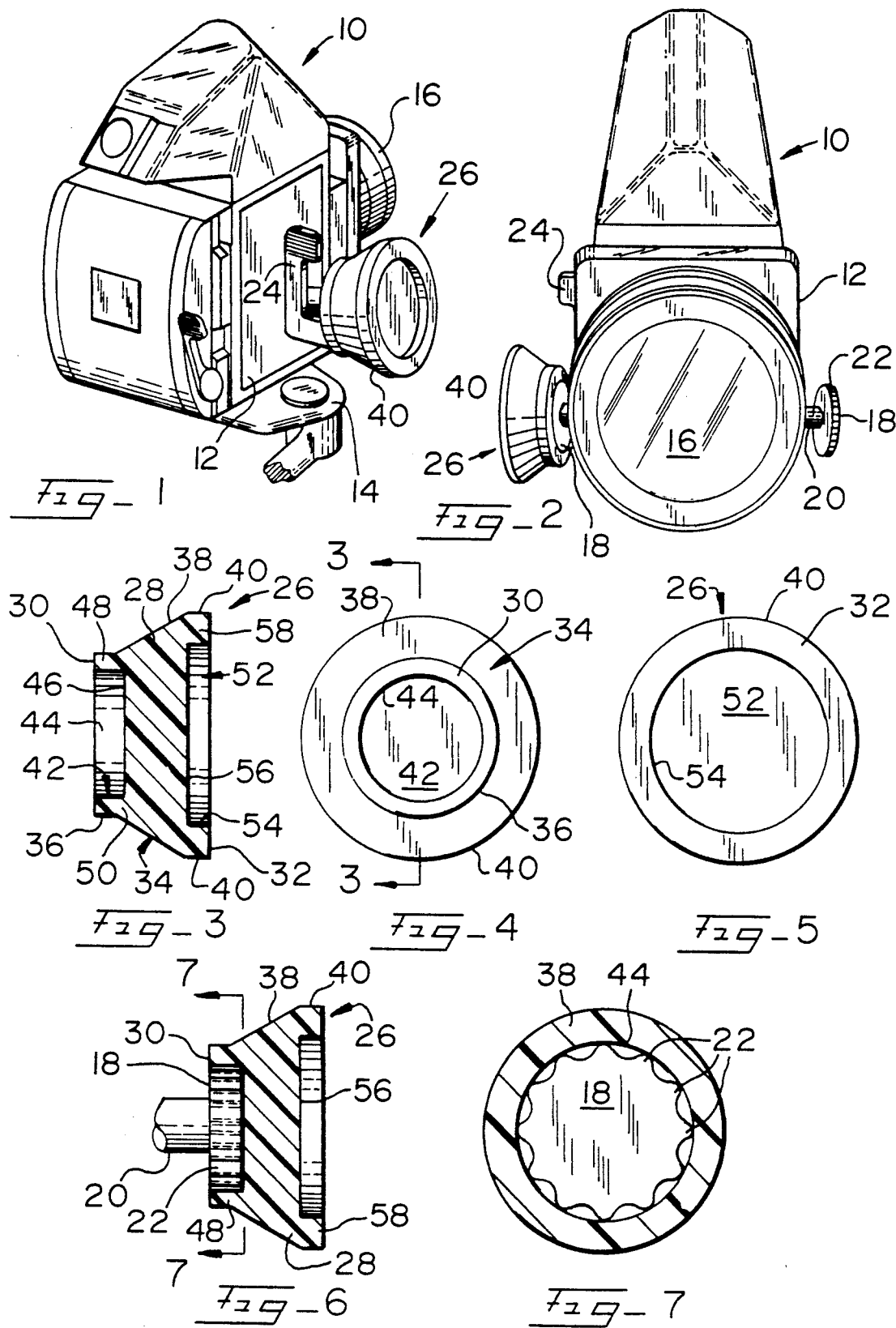

AUXILIARY CAMERA KNOB

BACKGROUND OF THE INVENTION

1. Field of the Invention

The invention pertains to auxiliary knobs used in conjunction with cameras focused by rotating a knob associated with rack and pinion focusing systems. The auxiliary knob improves handling, access and operating characteristics.

2. Description of the Related Art

Photographic cameras of the professional type as mounted upon a tripod or other fixed structure often include a focusing mechanism for adjusting the focus. Such focusing systems often consist of rack and pinion type drives wherein the rotation of a focusing knob rotates a gear meshing with a rack which permits the lens system to be adjusted.

Because of size and design limitations, access to such focusing knobs may be limited. With many camera designs using focusing knobs the knobs are relatively small in diameter, which requires a relatively tight grip upon the knob to produce the necessary torque to adjust the lenses.

In addition to requiring relatively high torque for camera focusing, the conventional knobs are often mounted so close to the camera body, and levers and operating mechanism mounted upon the camera body, that the fingers often engage the camera body during operation of the focusing knob, and women will often break fingernails due to the proximity of the knob to the camera body and camera body components. Even more seriously, the size of the focusing knobs, the frequency of usage, and the torque required to produce focusing, may cause medical problems of the wrist, hand, fingers or forearm, and may cause carpal tunnel and arthritis symptoms.

SUMMARY OF THE INVENTION

It is an object of the invention to provide an inexpensive auxiliary camera focusing knob capable of being readily placed upon the conventional camera focusing knob, and wherein the auxiliary knob includes a turning surface having a diameter substantially greater than that of the camera focusing knob, and the turning surface engaged by the fingers is located remotely from the camera body and associated components.

Another object of the invention is to provide an auxiliary camera focusing knob which may be easily placed upon conventional camera focusing knobs and is held thereon by the elastomeric material of the auxiliary knob frictionally grasping the camera focusing knob.

A further object of the invention is to provide an auxiliary camera focusing knob adapted to be placed upon, and supported by, a conventional camera focusing knob and wherein the diameter of a knob turning surface defined on the auxiliary knob provides a significant mechanical advantage with respect to camera focusing as compared to the standard focusing knob, permits quicker accurate focusing, reduces posing time, and reduces medical problems attendant with camera focusing.

The auxiliary focusing knob in accord with the invention comprises a body of elastomeric material, such as rubber, which is of an elongated configuration having an axis of rotation when applied to the rotatable camera focusing knob upon which it is placed and supported.

The knob includes an inner end having a cylindrical recess defined therein which is of a diameter slightly less than the maximum diameter of the camera focusing knob. The recess is surrounded by an annular axially extending lip defined by the auxiliary knob material which is capable of outwardly resiliently expanding whereby the camera focusing knob may be inserted into the recess and the resilient nature of the auxiliary knob material will produce an effective gripping and frictional connection with the camera focusing knob.

At its outer end, the auxiliary knob is provided with a cylindrical turning surface of a diameter substantially greater than the diameter of the standard camera focusing knob. Accordingly, the greater diameter of the knob turning surface reduces the effort to provide camera focusing.

An annular cavity is formed in the auxiliary knob outer end in radial alignment with the knob turning surface to form an inwardly deformable rim which permits limited inward radial deflection of the knob turning surface when grasped by the fingers to give the auxiliary knob a soft and high quality feel as the auxiliary knob is rotated.

The central region of the auxiliary knob between its inner and outer ends is of a conical configuration, and the depth of the recess receiving the camera focusing knob is greater than the axial dimension of the flexible lip circumscribing the recess whereby the conical configuration of the knob outer surface provides increased lip thickness which increases the resistance to expansion of the knob material, and this configuration assures a firm mounting of the auxiliary knob upon the camera focusing knob.

The auxiliary knob turning surface is significantly axially spaced from the knob inner end and this spacing places the turning surface remotely from the camera body and associated components providing excellent access to the turning surface and eliminating finger contact with the camera body as the auxiliary knob is rotated.

BRIEF DESCRIPTION OF THE DRAWINGS

The aforementioned objects and advantages of the invention will be appreciated from the following description and accompanying drawings wherein:

FIG. 1 is a rear and side perspective view of the type of camera utilizing an auxiliary knob in accord with the inventive concepts, the auxiliary knob being installed upon the camera focusing knob nearest the viewer, FIG. 2 is a front perspective view of the camera FIG. 1, the auxiliary knob of the invention being mounted upon the left camera focusing knob as viewed, and the right camera focusing knob being illustrated in its normal manner, FIG. 3 is a diametrical, elevational, sectional view as taken through an auxiliary camera knob in accord with the invention along Section 3—3 of FIG. 4, FIG. 4 is an end elevational view of the auxiliary knob inner end as taken from the left of FIG. 3, FIG. 5 is an elevational view of the auxiliary knob outer end as taken from the right of FIG. 3, FIG. 6 is a diametrical, elevational, sectional view of the auxiliary knob as placed upon a conventional camera focusing knob, and FIG. 7 is an elevational, sectional view as taken along Section 7—7 of FIG. 6.

DESCRIPTION OF THE PREFERRED EMBODIMENT

A typical photographic camera of the type which would use the auxiliary focusing knob in accord with the invention will be apparent from FIGS. 1 and 2 wherein the camera is generally indicated at 10. The illustrated camera is one manufactured by Mamiya, and it is to be understood that the knob of the invention may be employed with a wide variety of cameras and optical devices, it only being required that the critical dimensions being adapted to the particular equipment with which the auxiliary knob is The camera 10 includes a body 12 which is normally mounted upon a tripod by means of the tripod mounting structure 14, FIG. 1. The camera includes an adjustable lens system 16 wherein the lens 16 may be adjusted relative to the body 12 for focusing purposes. Such focusing is accomplished through a pair of camera focusing knobs 18 located upon opposite sides of the body 12, FIG. 2. The knobs 18 are mounted upon a shaft 20 upon which is supported a spur gear, or the like, not shown, which meshes with a gear rack, not shown, connected to the lens 16 whereby rotation of the shaft 20 will move the lens 16 toward and away from the camera body 12, as is well known.

The camera focusing knobs 18 are usually formed of a rigid plastic, and the periphery of the knobs is usually provided with a plurality of ribs 22 to improve friction with the fingertips to aid in knob rotation. The diameter of the knobs 18 is usually a little less than one and one-half inches, and as will be appreciated from FIG. 2, the knobs 18 are located relatively close to the camera body 12.

Various operating structure is mounted upon the camera body 12, such as the lever 24, which may be for film advancement purposes, or the like, and little clearance often exists between the knobs 18 and the camera body 12, and the knobs 18 and lever 24, and the like. Accordingly, access to the knobs 18 by the fingers is somewhat restricted, and because a knob 18 is located adjacent lever 24 the fingernails often engage the lever 24 and are broken thereby. This problem is particularly prevalent when focusing is attempted by women due to the longer fingernails.

As the diameter of the knobs 18 is relatively small, and as focusing of the lens 16 often requires significant effort, rotation of the knobs 18 with the fingertips may be relatively difficult, and this one of the reasons that two knobs are used whereby the shaft 20 may be rotated by both hands, each hand being associated with a knob.

The auxiliary knob constituting the invention is best illustrated in FIGS. 3-7 wherein the auxiliary knob is indicated at 26. The auxiliary knob 26 includes a body 28 which is formed of an elastomeric material, and preferably is formed by NBR rubber having a grade 70 durometer, and the knob is formed by a compression molding process. The knob material may be of any desired color. While black is the standard knob color, it may be white or of neon colors which aid in locating the knob in a darkened room, as is common in photography studios using controlled lighting.

The body 28 is of an elongated configuration having a central axis, and the ends of the body are defined by the inner end 30, which, when the auxiliary knob is mounted upon the camera 10, is disposed toward the camera, and an outer end 32.

The outer configuration of the body 28 is defined by the outer surface 34 which includes a cylindrical lip surface 36 adjacent the inner end 30 and intersecting the inner end. A tapered or conical central region surface 38 comprises the central portion of the outer surface 34, and a cylindrical knob turning surface 40 which intersects the body outer end 32 defines the remainder of the outer surface 34.

A cylindrical recess 42 is concentrically defined within the body inner end 30 and includes a cylindrical wall 44 and a flat end wall 46 defining the bottom of the recess. The diameter of the wall 44 is less than the diameter of the lip surface 36 resulting in an annular lip 48 formed of the rubber of the body 28 which is in radial alignment with the recess 42.

As will be appreciated from FIGS. 3 and 6, the longitudinal depth of the recess 42 as defined by the end wall 46 is greater than the axial dimension of the lip surface 36, and due to the configuration of the tapered surface 38 the innermost portion of the recess 42 will be surrounded by a thicker lip portion as indicated at 50, FIG. 3.

A cavity 52 is concentrically defined in the knob body outer end 32, and the cavity 52 includes the cylindrical wall 54 and is axially defined by the end wall 56. Preferably, the axial dimension of the cavity 52 equals the axial dimension of the knob turning surface 40, and the cavity 52 is in radial alignment with the surface 40. This relationship produces an annular rim 58 radially located with respect to the surface 40, and due to the elastomeric nature of the material of the body 28, the rim 58 is of such radial thickness as to permit limited inward radial deformation by the fingers when gripping the surface 40. Such deformation of the rim 58 produces a soft and high quality feel to the knob 26 during use, improves friction and reduces finger fatigue and hand medical problems.

To use the auxiliary knob 26 of the invention, it is merely necessary to axially align the recess 42 with a camera focusing knob 18. The normal diameter of the recess surface 44 is slightly less than the maximum diameter of the knobs 18 as defined by the outermost portions of the ribs 22. For instance, the diameter of the recess wall 44 may be 0.020 inches smaller than the maximum diameter of the knobs 18. Accordingly, when the knob 26 is pushed upon the knob 18, the knob 18 will be received within the recess 42 until the recess wall 46 is engaged, FIG. 6. Entry of the knob 18 into the recess 42 will radially expand the elastomeric material within lip 48 and produce a firm and high frictional engagement between the recess wall 44 and the knob 18 as the ribs 22 will be firmly engaging the recess wall 44. Also, due to the presence of the thicker lip portion at 50, full insertion of the knob 18 into the recess 42 will produce a firm and highly frictional interconnection between the knob 26 and the knob 18 as the greater wall thickness at 50 will resist the expansion of the lip 48. Usually, an auxiliary knob 26 will be located on each camera knob 18.

Rotation of the knobs 26 and 18 is now accomplished by the photographer gripping the knob turning surface 40 of the auxiliary knob with the fingertips, and rotation of the auxiliary knob 26 will produce a like rotation of the associated camera focusing knob 18. In a commercial embodiment of the invention, the diameter of the surface 40 is approximately two and three-quarter inches, and as this dimension is considerably greater than the diameter of the knobs 18, a greater torque arm with respect to shaft 20 is provided which minimizes the effort required to rotate shaft 20. Further, the greater diameter of the surface 40 permits a finer and smoother adjustment and rotation of the shaft 20 than is capable with the smaller camera focusing knobs 18.

When it is desired to remove the auxiliary knobs 26 from the knobs 18, the auxiliary knobs may be pulled from the knobs 18 so as to disengage the camera focusing knobs from the recesses 42.

As will be appreciated from the drawings, the knob turning surface 40 is axially separated from the inner surface 30, in practice, almost one and one-half inches, and the fact that the axial dimension of the auxiliary knob 26 is considerably greater than that of the camera focusing knobs 18 the access to the knob turning surface 40 is much easier than with respect to knobs 18, and fingernail breakage problems are eliminated. The larger diameter of the turning surface 40 as compared to the diameter of the knobs 18 significantly reduces the torque required to produce camera focusing which reduces fatigue in the hand, wrist and forearm and reduces the likelihood of medical problems including carpal tunnel and arthritis. Also, accurate focusing time can be reduced which shortens the necessary posing time by the subject being photographed and increases productivity.

An auxiliary knob in accord with the invention can be economically produced, and may be installed and removed from the camera focusing knobs 18 by photographers of conventional mechanical skills and aptitude.

It is appreciated that various modifications to the inventive concepts may be apparent to those skilled in the art without departing from the spirit and scope of the invention.

I claim:

1. An auxiliary knob for mounting on a focusing knob of a camera wherein the focusing knob has an axial length and a circumferential configuration having a predetermined diameter comprising, an auxiliary knob body formed of an elastomeric material, said body having a longitudinal axis, an inner end, an outer end axially spaced from said inner end, and an outer surface, a knob turning surface defined on said outer surface adjacent said outer end concentric to said axis having a dimension perpendicular to said axis greater than the predetermined diameter of the camera focusing knob, a recess defied in said knob body inner end concentric to said axis having a circumferential configuration substantially similar to the circumferential configuration of the focusing knob and of a diameter slightly less than the predetermined diameter of the focusing knob, said recess being of an axial length substantially equal to the axial length of the camera focusing knob and adapted to frictionally receive and elastomerically grasp and support the knob body upon the focusing knob whereby rotation of the knob body by engaging said knob turning surface will rotate the focusing knob, said auxiliary knob body including a thin wall portion circumscribing said recess in radial alignment therewith, said thin wall portion enhancing the flexibility of said body adjacent said recess.

2. In an auxiliary knob as in claim 1, said nob turning surface comprising a substantially cylindrical surface, a cylindrical cavity concentrically defined in said auxiliary body outer end in radial alignment with said knob turning surface, said cavity having a diameter slightly less than the diameter of said knob turning surface whereby said cavity permits limited radial deformation of said knob turning surface to impart a softer feel to said knob turning surface.

3. An auxiliary camera knob comprising an elongated body of elastomeric material having an axis, an inner end, an outer end axially spaced from said inner end and an outer surface, a substantially cylindrical knob turning surface defined on said outer surface adjacent said outer end concentric to said axis, a substantially cylindrical recess concentrically defined within said body inner end, a substantially cylindrical lip surface defined on said body outer surface adjacent said inner end in radial alignment with said recess, said lip surface having a diameter greater tan the diameter of said recess whereby an annular resilient lip is radially defined between said lip surface and said recess, the diameter of said lip surface being less than the diameter of said knob turing surface, said outer surface including a conical central region surface concentric to said body axis intersecting said knob turning surface and said lip surface whereby the radial dimension of said annular lip increases in the axial direction toward said outer end.

4. In an auxiliary camera knob as in claim 3, a substantially cylindrical cavity concentrically defined in said body outer end having a diameter less than the diameter of said knob turing surface and in radial alignment therewith forming a radially deformable rim to impart a soft feel to said knob turning surface under inward radial compression.

* * * * *